United States Patent [19]
Gaetcke

[11] 3,881,459
[45] May 6, 1975

[54] INLET VALVE FOR INTERNAL COMBUSTION ENGINE AND METHOD FOR SUPPLYING FUEL THERETO

[76] Inventor: Werner Gaetcke, 4603 Locust, Bellaire, Tex. 77401

[22] Filed: Feb. 28, 1974

[21] Appl. No.: 446,608

[52] U.S. Cl....... 123/188 R; 123/75 B; 137/614.16; 123/79 C
[51] Int. Cl................................................ F01l 3/06
[58] Field of Search........ 123/79 C, 188 R, 188 AF, 123/188 VA, 90.22, 75 B; 137/614.17, 614.16, 599.2

[56] References Cited
UNITED STATES PATENTS

| | | | |
|---|---|---|---|
| 1,728,500 | 9/1929 | Martorell | 137/599.2 X |
| 1,853,464 | 4/1932 | Serste | 123/79 C |
| 3,015,323 | 1/1962 | Buchi | 123/79 C |

FOREIGN PATENTS OR APPLICATIONS

| | | | |
|---|---|---|---|
| 1,181,489 | 11/1964 | Germany | 123/79 C |

Primary Examiner—Charles J. Myhre
Assistant Examiner—William C. Anderson
Attorney, Agent, or Firm—Bargfrede and Thompson

[57] ABSTRACT

An inlet valve means and method for supplying a combustible mixture to the combustion chamber of an internal combustion engine is described. The inlet valve means includes concentrically arranged sections defining a main valve means and an auxiliary valve means. The auxiliary valve means defines a flow passage into the combustion chamber which is inboard of the flow passage defined by said main valve means. During supply of fuel to the combustion chamber the auxiliary valve means and the main valve means are sequentially opened, whereby the supply of fuel is initially constrained to the central portion of said combustion chamber for improved combustion and increased engine efficiency.

9 Claims, 6 Drawing Figures

INLET VALVE FOR INTERNAL COMBUSTION ENGINE AND METHOD FOR SUPPLYING FUEL THERETO

BACKGROUND OF THE INVENTION

1. Field of Invention

The present invention relates to an inlet valve means and method for supplying a combustible mixture to a variable volume combustion chamber of an internal combustion engine. More specifically, the present invention relates to an inlet valve means having two concentrically arranged sections which are sequentially operated to supply said combustible mixture to said combustion chamber in stages along controlled flow paths.

2. Description of Prior Art

Prior art devices are known which employ main and auxiliary inlet valves in the inlet port of the combustion chamber of an internal combustion engine. Devices of this type are disclosed in U.S. Pat. No. 3,494,336 to Myers et al. issued Feb. 10, 1970; U.S. Pat. No. 3,507,261 to Myers et al. issued Apr. 21, 1970; and U.S. Pat. No. 3,557,762 to Mitchell issued Jan. 26, 1971.

However, in devices of the above patents the fuel passing through the inlet port always passes through said port along the external walls of said port and then immediately fans out along the external walls of the combustion chamber. The introduction of fuel in this manner can remove the protective lubricating oil film which is generally present on the cylinder walls, thereby causing the engine to over heat. In addition the valves of the above-mentioned prior art patents do not provide a means for introducing fuel which results in a sufficient amount of turbulence in said combustion chamber.

SUMMARY OF THE INVENTION

Accordingly, it is an object of the present invention to provide an inlet valve structure for an internal combustion engine which increases the amount of turbulence in the combustion chamber.

It is another object of the present invention to provide an improved inlet valve for an internal combustion engine which increases the suction or intake velocity of the fuel flowing to the combustion chamber.

It is still another object of the present invention to provide an inlet valve for an internal combustion engine which enhances the mixing of the fuel and air in the combustion chamber.

It is a further object of the present invention to provide an inlet valve structure for an internal combustion engine which increases the cylinder capacity of the engine.

It is still a further object of the present invention to provide an inlet valve means for an internal combustion engine which enhances the power performance of the engine and hence the efficiency of the consumption of fuel.

It is yet another object of the present invention to provide an inlet valve for an internal combustion engine which constrains the introduction of fuel toward the center of the combustion chamber thus avoiding the removal of the oil film on the cylinder walls.

These and other objects of the present invention are fulfilled by providing an inlet valve means in an inlet port to the combustion chamber of an internal combustion engine including a main valve and a concentrically arranged auxiliary valve disposed inboard of said main valve. The inlet port is substantially aligned with the central axis of the combustion chamber. Therefore, when the auxiliary valve is opened the flow of fuel is constrained toward the central portion of the combustion chamber to create a central region of turbulence in the combustion chamber. The subsequent opening of the main valve permits the flow of a portion of the fuel around the auxiliary valve but said portion of fuel is immediately sucked toward the center of the combustion chamber due to the negative pressure in that area created by the region of turbulence. Therefore, by opening the auxiliary valve prior to opening the main valve assures the initial flow of fuel through both valves toward the center of the combustion chamber.

BRIEF DESCRIPTION OF DRAWINGS

The objects of the present invention and the attendant advantages thereof will become more apparent by reference to the following description of the drawings wherein.

DETAILED DESCRIPTION OF DRAWINGS

Figures 1, 2:
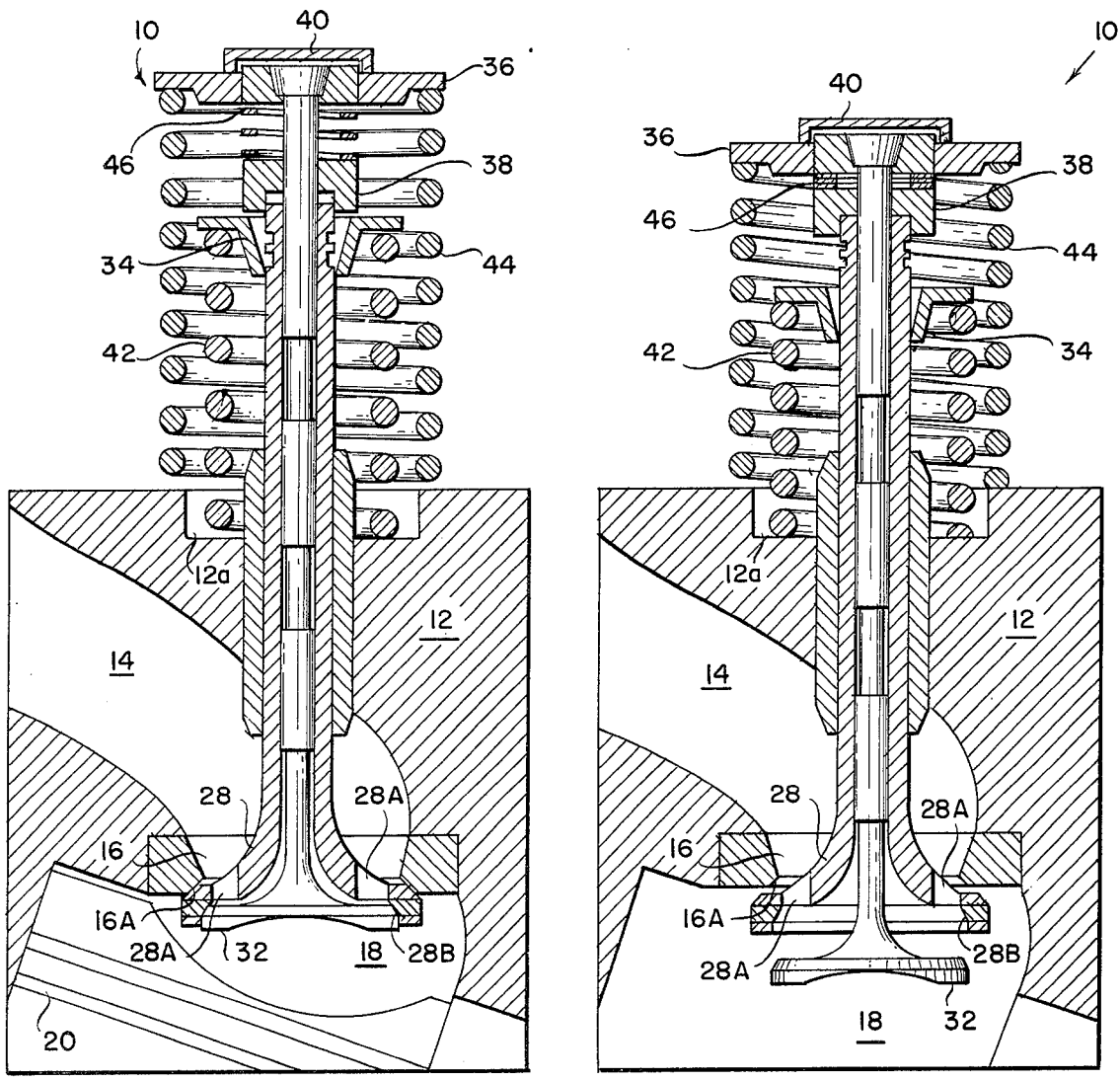
FIG. 1 is a side elevational view in section of the inlet valve of the present invention in a closed position.
FIG. 2 is a side elevational view in section of the inlet valve of FIG. 1 in an open position.
Figures 3A, 3B, 4A, 4B:
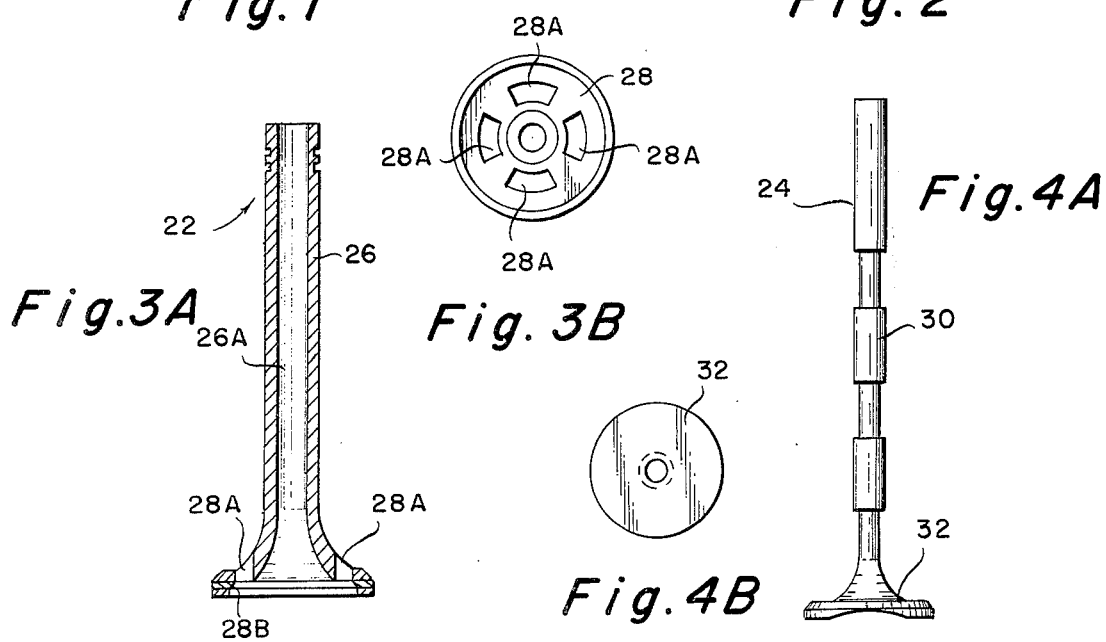
FIG. 3A is a side elevational view of the main valve stem and main valve head of the inlet valve of the present invention.
FIG. 3B is a bottom plan view of the main valve head of FIG. 3A.
FIG. 4A is a side elevational view of the auxiliary valve stem and auxiliary valve head of the inlet valve of the present invention.
FIG. 4B is a bottom plan view of the auxiliary valve head of FIG. 4A.

Referring in detail to the drawings there is shown a valve means generally designated 10 mounted in the bore of a cylinder head 12 of an internal combustion engine. Cylinder head 12 includes means defining an inlet passage 14, a combustion chamber 18, and an inlet port 16 connecting inlet passage 14 with combustion chamber 18. As is conventional in internal combustion engines a piston 20 is disposed in combustion chamber 18 as well as suitable ignition means, not shown.

Inlet valve 10 comprises two separate concentric sections including a main valve 22 and an auxiliary valve 24. Auxiliary valve 24 is disposed within main valve 22 for reasons that will become more fully apparent hereinafter.

Main valve 22 includes a stem portion 26 having a longitudinal bore 26A therein and a main valve head 28. Valve head 28 is provided with a plurality of arcuate slots 28A defining flow passages through head 28. The sizes of slots 28A are chosen to control the rate of flow through said slots within predetermined limits. Valve head 28 is dome-shaped and the concave side thereof defines a valve seat 28B for auxiliary valve 24 to be described hereinafter.

Auxiliary valve 24 includes auxiliary valve stem 30 which is disposed for reciprocating movement within longitudinal bore 26A of main valve stem 26. Valve stem 30 is connected at one end thereof to auxiliary valve head 32 which in a preferred embodiment is a dome-shaped disk which conforms to the shape of main valve head 28 and seats tightly against valve seat 28B therein.

Main valve 22 and auxiliary valve 24 are normally biased in a closed position, as shown in FIG. 1, by coil springs 44 and 42, respectively, disposed at the opposite ends of valve stems 26 and 30 from valve heads 28 and 32. Spring 42 is tensioned between a recess 12A in cylinder head 12 and a collar 34 screwed or secured in some other manner to the top of valve stem 26. Spring 44 is concentric with spring 42 and is tensioned between the top of cylinder block 12 and a collar 36 screwed on the top end of valve stem 30. A third coil spring 46 is provided around valve stem 26 in the region between a cap 38 on the top of valve stem 26 and the underside of collar 36. Coil spring 46 provides a cushioning effect between cap 38 and collar 36 when said cap and collar are compressed together. Valve stem 30 is also provided with a cap 40 at the top thereof.

DESCRIPTION OF OPERATION

With the valve means 10 shown in the closed position of FIG. 1 at the beginning of a cycle, fuel in the form of a combustible mixture is introduced into cylinder head 12 through inlet passage 14. A cam means or any other suitable drive means (not shown) engages cap 40 on the end of auxiliary valve stem 30 to thereby depress valve stem 30 and remove valve head 32 from engagement with valve seat 28B. Therefore, auxiliary valve 24 opens and the fuel or combustible mixture in inlet passage 14 flows through arcuate slots 28A in valve head 28 into the central region of combustion chamber 18. This flow of fuel creates a central region of turbulence in chamber 18 which develops a negative pressure in said region.

Valve stem 30 continues to be depressed until collar 36 engages cap 38 on the top of main valve stem 26. As collar 36 continues downwardly main valve stem 26 is depressed thereby moving valve head 28 out of engagement with valve seat 16A in inlet port 16. Thus both main valve 22 and auxiliary valve 24 are now open, as shown in FIG. 2, permitting the flow of additional amounts of fuel into combustion chamber 18.

It is a distinguishing feature of the present invention that auxiliary valve 24 be opened first in order to create a region of turbulence or negative pressure at the center of combustion chamber 18. Thus, when fuel is subsequently permitted to flow through inlet port 16 around valve head 28, said fuel is first sucked toward the central region of combustion chamber 18 and from there expands to fill the surrounding space.

At the completion of the fuel intake cycle the cam means is moved out of engagement with end cap 40 and valves 22 and 24 are returned to the closed position of FIG. 1 by the action of coil springs 44 and 42.

In one embodiment of the present invention the actuation of valves 22 and 24 may be controlled by any suitable timing means to independently control the time of actuation of the respective valves. In other words valve stems 26 and 30 may be actuated by independent cam means or any other suitable means instead of by a single cam which engages cap 40. Thus, an advance and delay of the sucked in medium would occur, causing increased turbulence.

The apparatus and method described herein may be modified as would occur to one of ordinary skill in the art without departing from the spirit and scope of this invention.

It is claimed:

1. In combination with an internal combustion engine having a cylinder defining a variable volume combustion chamber and means defining an inlet passage to deliver a combustible mixture to said combustion chamber, inlet valve means for controlling the flow of said combustible mixture from said inlet passage to said combustion chamber, said inlet valve means comprising:
   a. means defining an inlet port in said combustion chamber connecting said inlet passage with said combustion chamber, said inlet port having a portion defining a first valve seat;
   b. main valve means having a main valve head moveable out of and into engagement with said first valve seat to respectively open and close said port to flow therethrough, said main valve head including means defining at least one flow passage therein for permitting the flow of said combustible mixture from said inlet passage therethrough, said main valve head further including means defining a second valve seat surrounding said at least one flow passage;
   c. auxiliary valve means having an auxiliary valve head disposed for movement out of and into engagement with said second valve seat for respectively opening and closing said at least one flow passage in said main valve head to flow therethrough; and
   d. means for sequentially moving said auxiliary valve head out of engagement with said second valve seat and said main valve head out of engagement with said first valve seat to permit the flow of said combustible mixture from said inlet passage to said combustion chamber, first through said at least one flow passage, and second through said inlet port around said main valve head.

2. The apparatus of claim 1 wherein said main valve head comprises a disk and said at least one flow passage in said valve head is disposed inboard of the edges of said disk.

3. The apparatus of claim 2 wherein said at least one flow passage comprises a plurality of arcuate slots.

4. The apparatus of claim 1 wherein said main valve means further includes a main valve stem connected to said main valve head and mounted for reciprocating movement in said inlet port, said main valve stem having a longitudinal bore therein, and said auxiliary valve means further includes an auxiliary valve stem connected to said auxiliary valve head and mounted for reciprocating movement in said longitudinal bore.

5. The apparatus of claim 4 wherein said main valve head and said auxiliary valve head are dome-shaped and the concave side of said main valve head defines said second valve seat for the convex side of said auxiliary valve head.

6. The apparatus of claim 4 wherein said main valve stem and said auxiliary valve stem are spring biased to normally hold the respective valve heads out of engagement with said first and second valve seats, respectively.

7. The apparatus of claim 6 wherein said auxiliary valve stem further includes first collar means rigidly affixed at the opposite end of said auxiliary valve stem from said auxiliary valve head and said main valve stem further includes second collar means rigidly affixed to the opposite end of said main valve head said first and second collar means being spaced in the longitudinal direction of said valve stems and wherein said means for sequentially moving said main and auxiliary valve heads out of engagement with said first and second valve seats, respectively, includes means for driving said first collar means toward said second collar means to open said auxiliary valve means and into engagement with said second collar means to open said main valve means in seriatim.

8. The apparatus of claim 7 wherein there is further provided spring means between said first and second collar means.

9. The apparatus of claim 1 wherein said inlet port means is disposed in alignment with a central axis of said combustion chamber.

* * * * *